United States Patent [19]

Onder

[11] Patent Number: 4,975,910

[45] Date of Patent: Dec. 4, 1990

[54] METHOD OF OPERATING A PACKET SWITCHING NETWORK

[75] Inventor: Yavuz Onder, Ottawa, Canada

[73] Assignee: Northern Telecom Limited, Montreal, Canada

[21] Appl. No.: 454,595

[22] Filed: Dec. 21, 1989

[51] Int. Cl.$^5$ .............................................. H04J 3/24
[52] U.S. Cl. .................................. 370/94.100; 370/60
[58] Field of Search ...................... 370/60, 60.1, 94.1, 370/85.1, 85.2, 85.3, 85.6, 94.3; 340/825.5, 825.51; 379/29, 18, 93, 94, 219, 15, 27, 112, 225, 229, 230

[56] References Cited

U.S. PATENT DOCUMENTS

| 4,706,242 | 11/1987 | Harland | 370/60 |
|---|---|---|---|
| 4,755,992 | 7/1988 | Albal | 370/94.1 |
| 4,827,473 | 5/1989 | Tsuzuki et al. | 370/94.1 |
| 4,887,260 | 12/1989 | Carden et al. | 370/94.1 |
| 4,893,307 | 1/1990 | McKay et al. | 370/94.1 |

Primary Examiner—Douglas W. Olms
Assistant Examiner—Alpus H. Hsu
Attorney, Agent, or Firm—Dallas F. Smith

[57] ABSTRACT

A method of operating a packet switching network is disclosed in which an X.25 terminal or computer can access the network via a public switched telephone network (PSTN) or a circuit switched public data network (CSPDN) in accordance with CCITT standard X.32. An access port provides dial in and out service which automatically adapts to both the level-2 addressing (DCE and DTE) and protocol (LAPB of LAPBE) of the terminal or computer connected via the PSTN or CSPDN.

14 Claims, 3 Drawing Sheets

METHOD OF OPERATING A PACKET SWITCHING NETWORK

This invention relates to a method of operating a packet switching network, and is particularly concerned with such operation that allows a computer or a terminal to access the packet switching network via a public switched network.

Within data packet communications, the main standard is CCITT X.25, the international standard for data communication by way of a public data packet network. Since its introduction in 1976, X.25 has standardized network access protocols for packet-mode terminals and computers. The physical link for such terminals has been via dedicated lines. The costs for leased dedicated lines may prevent those having infrequent use or low traffic volume from using X.25 access. In response to a demand for an alternative, CCITT Recommendation X.32 specifies dial-in and dial-out capabilities of X.25 data terminating equipment (DTE).

Supporting communications between X.25 computers and X.25 terminals within a packet switching network relies on the fact that X.25 defines both ends of the link in strict terms to ensure, for example, that commands and responses use the same addressing convention and control mode for call set up. X.32 does not strictly define both ends, instead it gives a list of acceptable link protocol and address assignment methods. Therefore, when a computer or terminal initiates a call to or receives a call from outside the packet switching network, as is the case with X.32 dial-in and dial-out access, all possible combinations of address and control mode must be accommodated. Accommodation could be provided by multiple ports, each configured to a predetermined address and protocol mode. Such a solution is not satisfactory as it would require publishing a long list of dial-access numbers to support all the possible combinations. An end user, unfamiliar with communications protocols may find it difficult to determine which particular combination matched his particular equipment. Also, it may cause congestion problems because of a limited number of ports of a particular combination, while incurring overhead associated with having underused ports of other combinations.

An object of this invention is to provide an improved method of operating a packet switching network.

In accordance with one aspect of the present invention there is provided a method of operating a packet switching network to establish a link between an access port of the packet switching network and a remote end having a terminal or computer, the method comprising the steps of: (a) initializing the port with given values for link protocol and addressing modes; (b) inviting the remote end to initiate the link configuration; (c) if a command is received initiating the link configuration, altering or not the link protocol or addressing modes or both of the port in response to the link protocol and addressing of the remote end; (d) if a frame reject is received, examining the frame reject to determine probable values of link protocol and addressing for the port; (e) if less than a predetermined number of tries have been made to establish the link, reinitializing the port to the probable values, and repeating the method beginning with the step (b); and (g) if any other frame is received or a predetermined time for the remote end to respond lapses, altering the addressing mode and, if less than the predetermined number of tries have been made, repeating the method beginning with the step (b).

In accordance with another aspect of the present invention there is provided a method of operating a packet switching network to establish a link between an access port of the packet switching network and a remote end having a terminal or computer, the method comprising the steps of: (a) initializing the port with first values for link protocol and addressing modes from a cyclical list of such values, and on each subsequent try, reinitializing the port with the next listed values and initiating the link configuration; (b) if an acknowledgement is received, altering or not the addressing mode in response to the addressing of the acknowledgement; (c) if a command is received initiating the link configuration, altering or not the link protocol or addressing modes or both of the port in response to the link protocol and addressing of the remote end; (d) if a frame reject is received, examining the frame reject to determine probable values of link protocol and addressing for the port; and (e) if less than a predetermined number of tries have been made to establish the link, reinitializing the port to the probable values, and repeating the method beginning with the step (b).

In accordance with a further aspect of the present invention there is provided a method of operating a packet switching network to establish a link between an access port of the packet switching network and a remote end having a terminal or computer, the method comprising the steps of: (a) initializing the port with given values for link protocol and addressing modes; (b) inviting the remote end to initiate the link configuration; (c) if a command is received initiating the link configuration, altering or not the link protocol or addressing modes or both of the port in response to the link protocol and addressing of the remote end; (d) if a frame reject is received, examining the frame reject to determine probable values of link protocol and addressing for the port; (e) if less than a first predetermined number of tries have been made to establish the link, reinitializing the port to the probable values, and repeating the method beginning with the step (b); (g) if any other frame is received or a predetermined time for the remote end to respond lapses, altering the addressing mode and, if less than the predetermined number of tries have been made, repeating the method beginning with the step (b); (h) if the first predetermined number of tries have been made, reinitializing the port with first values for link protocol and addressing modes from a cyclical list of such values, and on each subsequent retry, reinitializing the port with the next listed values and initiating the link configuration; (i) if an acknowledgement is received, altering or not the addressing mode in response to the addressing of the acknowledgement; (j) if a command is received initiating the link configuration, altering or not the link protocol or addressing modes or both of the port in response to the link protocol and addressing of the remote end; (k) if a frame reject is received, examining the frame reject to determine probable values of link protocol and addressing for the port; and (l) if less than a second predetermined number of retries have been made to establish the link, reinitializing the port to the probable values, and repeating the method beginning with the step (b).

In an embodiment of the present invention the step of altering or not includes the steps of, if the command is as expected, checking the addressing, reversing the addressing mode if necessary, and sending an acknowledgement. The step of altering or not includes the steps of, if the command is not as expected, checking the addressing to determine if reversing the addressing mode is required, reinitializing the port as an alternate link protocol mode to that used for inviting the remote end and addressing mode as determined, and sending an acknowledgement. The step of altering or not includes the steps of, if the command received matches that sent, checking the addressing mode and reversing the addressing mode if necessary. The step of altering or not includes the steps of, if the command received does not match that sent, reinitializing the port as an alternate link protocol mode to that used for initiating the link configuration and addressing mode as in the received command. The list of values includes: LAPB, DCE; LAPB, DTE; LAPBE, DCE; and LAPBE, DTE.

This invention will be further understood from the following description with reference to the accompanying drawings, in which.

Packet switching networks are typically implemented on two types of devices which may be separate or integrated. These are packet switching nodes and packet network access interface modules. For this description the makeup of the packet network does not matter as each access module acts as an end point of a virtual circuit through the packet network.

Figure 1:
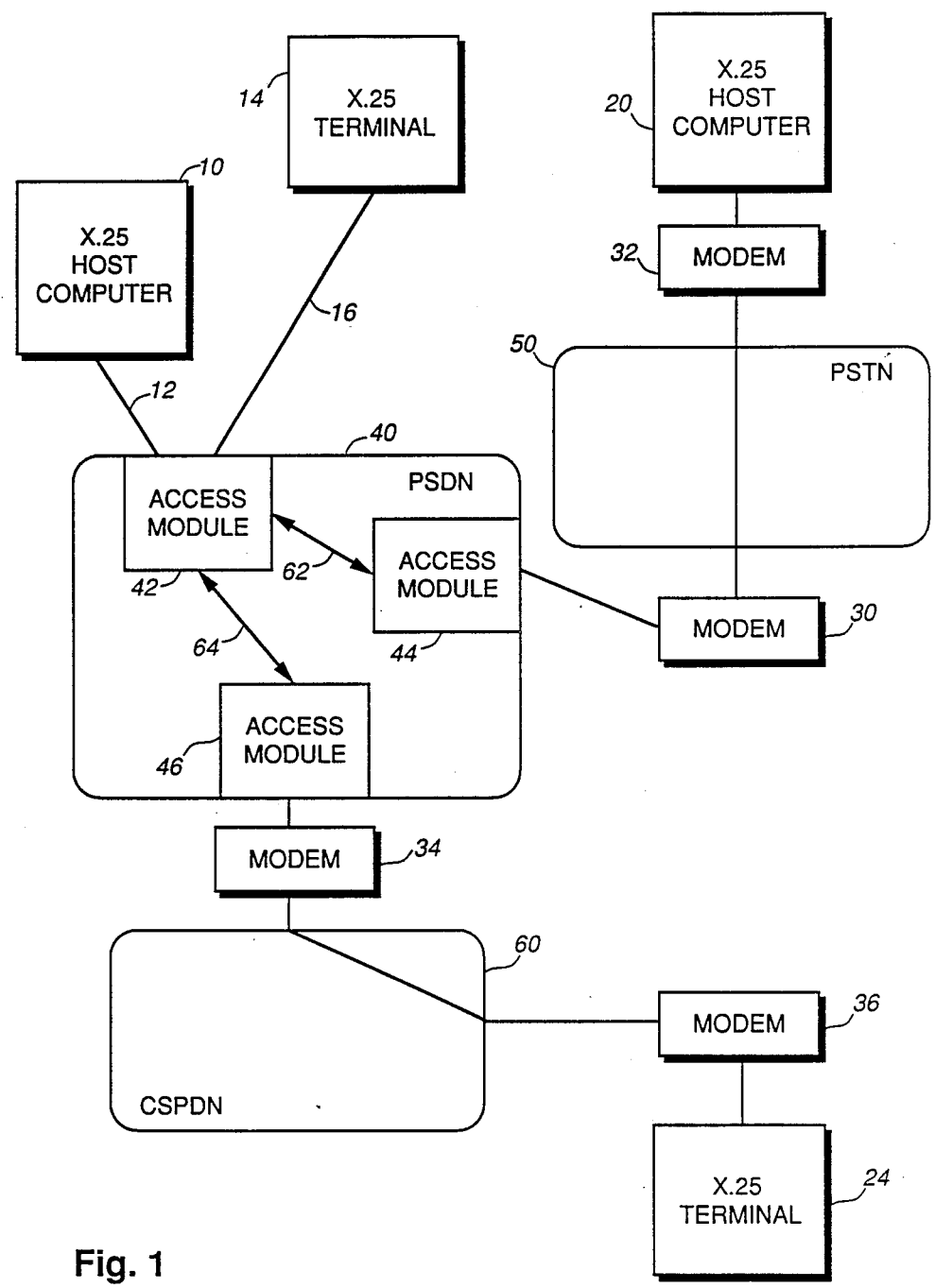
FIG. 1 illustrates, as a block diagram, a data communications system including a packet switching network, a public switched telephone network, and a circuit switched public data network.

Referring to FIG. 1, there is illustrated a simplified data communications network having computers 10 and 20, terminals 14 and 24, a public switched telephone network (PSTN) 50, a circuit switched public data network (CSPDN) 60 and a packet switching data network 40. The packet switching data network 40 includes access modules 42, 44, and 46. The computer 10 and the terminal 14 are connected to the access module 42 via dedicated X.25 communication links 12 and 16 respectively. The computer 20 is connected to the access module 44 via a modem 30, the PSTN 50 and a modem 32. The terminal 24 is connected to the access module 46 via a modem 34, the CSPDN 60 and a modem 36. Switched virtual circuits 62 and 64 complete communication links between the access module 42 and each of the access modules 44 and 46. For convenience, the computer 20 is considered connected by a dial-out connection and terminal 24 is considered connected by a dial-in connection.

In operation, on activation, a service is provided in access modules 44 and 46 for supporting X.32 access service. The X.25 terminal 14, connected via an X.25 link 16 to the access module 42, places a call to an X.25 host computer 20 which is not directly connected to the packet switching data network 40. The virtual circuit 62 is established between the access module 42 and the access module 44 serving the host computer 20. An X.32 port (not shown in FIG. 1) on the access module 44 initiates a dial-out procedure to complete a link via the modem 30, the public switched telephone network (PSTN) 50 and the modem 32, to the host computer 20. Once the link is established, the terminal 14 and host computer 20 communicate using X.25 protocol, as if both were connected to the PSDN 40 via dedicated X.25 links.

Similarly, the X.25 host computer 10, connected via an X.25 link 12 to the access module 42, receives a call from the X.25 terminal 24 which is not directly connected to the packet switching data network 40. On receiving a call from the X.25 terminal 24, an X.32 port (not shown in FIG. 1) on the access module 46 initiates a dial-in procedure to complete a link via the modem 34, the circuit switched public data network (CSPDN) 60 and the modem 36, to the host computer 10. Once the link is established, the terminal 24 and the host computer 10 communicate using X.25 protocol, as if both were connected to the PSDN 40 via dedicated X.25 links. Detail of the link establishment is given below with regard to FIGS. 2 and 3.

Figure 2:
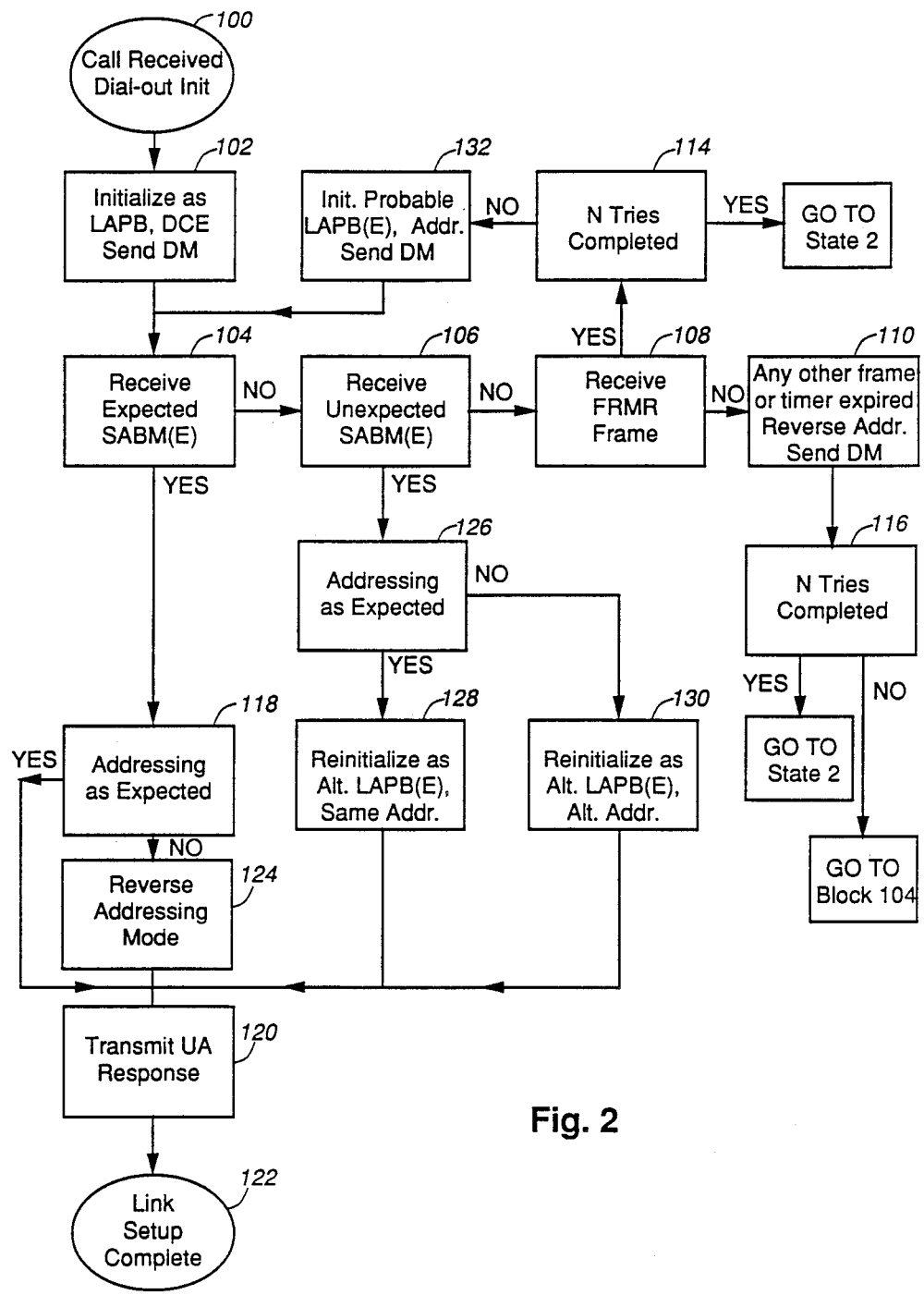
FIG. 2 illustrates, as a flow chart, steps in the method of establishing a link in a first state.
Figure 3:
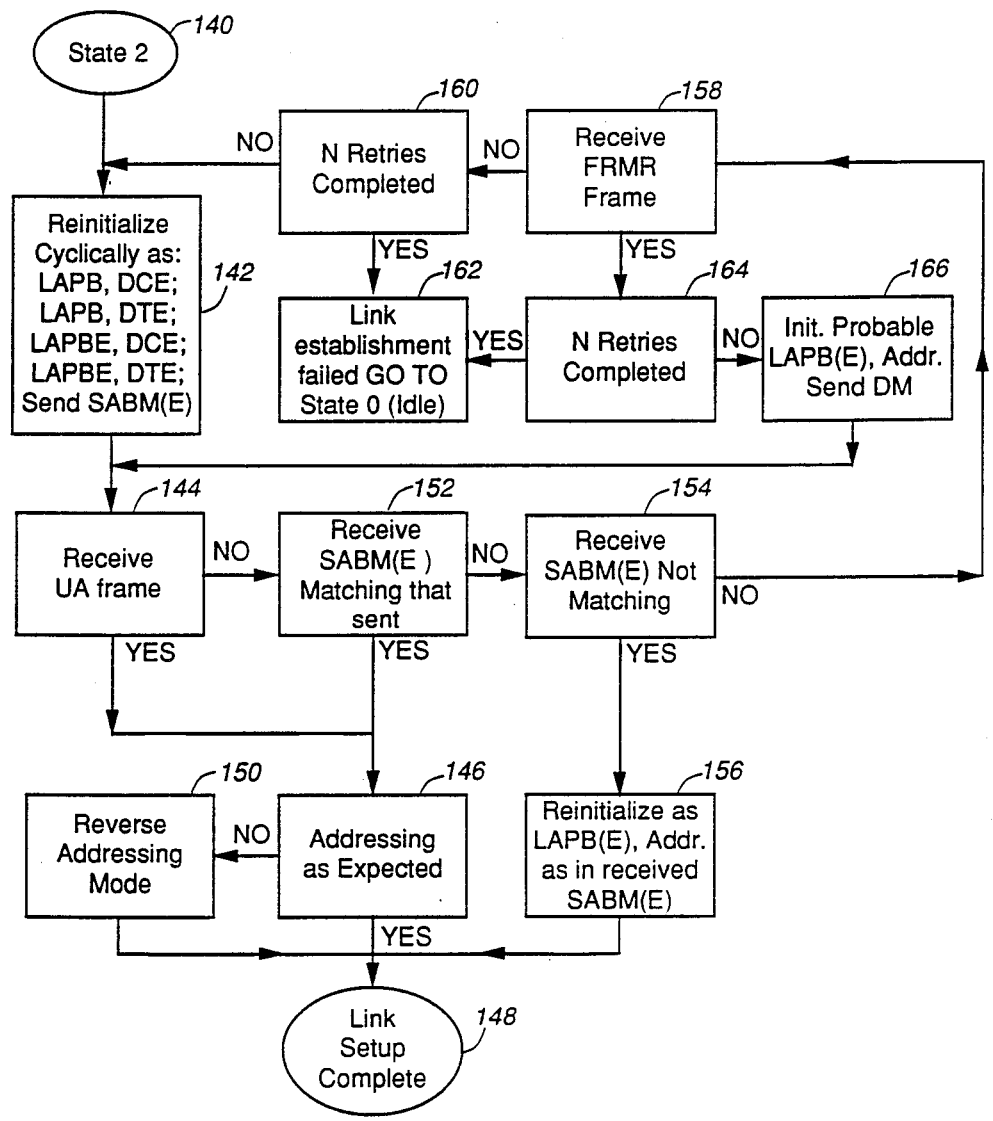
FIG. 3 illustrates, as a flow chart, steps in the method of establishing a link in a second state.

The method of establishing a link in a first state is illustrated as a flow chart in FIG. 2. The first state, S1, begins with a block 100 representing the X.32 port receiving a call from a remote terminal or computer or a dial-out initialization from within the packet switching network via the X.32 port to remote terminal or computer. A block 102 represents the X.32 port being initialized as protocol LAPB (link access protocol balanced) and address DCE (data communications equipment) and sending a DM (disconnect mode) response to the remote end, thereby inviting the remote end to initiate the link configuration. The port then waits for the remote end to send a command to establish the link. The command expected by a block 104 is a SABM (set asynchronous balanced mode) on a first attempt, and may change if a block 132, which may alter the protocol and addressing, is executed. A block 106 responds to unexpected SABM(E), e.g. a LAPB mode was set hence a SABM is expected but a SABME is received. If the DM is not accepted by the remote end a FRMR (frame reject) may be sent by the remote end. A block 108 receives a FRMR frame. If any other commands are received or if a timer for receiving a command expires, a block 110 sends another DM after reversing the addressing mode. A block 116 counts the number of tries to establish the link, and repeats the method steps beginning with the block 104. After a predetermined number of attempts, N, to establish the link are counted by the block 116, a second state, S2, is entered to attempt to set up the link.

If the expected SABM(E) command is received (e.g. a SABM received after a DM sent with the port protocol as LAPB), the block 104 is followed by a block 118 querying if the addressing is as expected. A yes response leads to a block 120 which transmits a UA (unnumbered acknowledgement) and leads to a block 122 which completes the link setup. A no response leads to a block 124, which reverses the address mode e.g. to DTE (data terminating equipment) on the first attempt, followed by the block 120 transmitting a UA response with the new addressing and the block 122 completing the link setup.

If the unexpected SABM(E) command is received (e.g. a SABME received after a DM sent with the port protocol as LAPB), the block 106 is followed by a block 126 querying if the addressing is as expected. A yes response leads to a block 128 which reinitializes the port as the alternate protocol and the same addressing as that used to send the DM. This is followed by the block 120 which transmits a UA (unnumbered acknowledgement) with the new protocol and leads to a block 122 which completes the link setup. A no response to the block 126 leads to a block 130 which reinitializes the port as the alternate protocol and addressing from that used to send the DM, followed by the block 120 transmitting a UA response with the new protocol and addressing and the block 122 completing the link setup.

If the FRMR frame is received, the block 108 is followed by the block 114 which counts the number of attempts to establish the link and enters a second state S2, when N attempts have been made. For less than N attempts, the block 114 is followed by a block 132 which looks at the FRMR frame received to determine the probable protocol and addressing of the remote end and initializes the port accordingly. The block 132 is followed by repeating the method steps beginning with the block 104.

Thus, providing that the remote end sends a command to establish the link, the port can adapt in the first state to establish the link regardless of protocol and addressing modes used. If the link cannot be established after a predetermined number of attempts, N, the port attempts to establish the link itself by entering the second state S2, the steps of which are illustrated in flow chart form in FIG. 3.

The second state, S2, begins with a block 140. A block 142 represents the X.32 port being initialized cyclically as one of each of the following protocol and address pairs: LAPB, DCE; LAPB, DTE; LAPBE, DCE; and LAPBE, DTE; and the sending of an appropriate SABM(E) command to the remote end. The port then waits for the remote end to send a response to complete the link setup. The response expected by a block 144 is a UA.

If the UA response is received, the block 144 is followed by a block 146 querying if the addressing is as expected. A yes response leads to a block 148 which completes the link setup. A no response leads to a block 150 which reverses the address mode (e.g. from DCE to DTE) followed by the block 148 completing the link setup.

If the UA response is not received, a block 152 looks for a SABM(E) command matching the SABM(E) sent. If the matching SABM(E) command is received, the block 152 is followed by the block 146 querying if the addressing is as expected. A yes response leads to the block 148 which completes the link setup. A no response to the block 146 leads to a block 150 which reverses the address mode (e.g. from DCE to DTE) followed by the block 148 completing the link setup. A no response to the block 152 leads to a block 154 that looks for a SABM(E) not matching the SABM(E) sent.

A yes response to the block 154 leads to a block 156 which reinitializes the port to use both protocol LAPB(E) and addressing to agree with the SABM(E) received. This is followed by the block 148 which completes the link setup. A no response to the block 154 leads to a block 158 which looks for an FRMR frame. A further no response leads to a block 160 which queries the number of retries to establish the link. If a predetermined number of retries, N, has not been made, the method steps are repeated beginning with the block 142, using the next protocol and address combination listed. A yes response to the block 160 causes the port to enter a state 0 in a block 162. In state 0 the port stops attempting to establish the link and stays idle till another call arrives.

If an FRMR frame is received, the block 158 is followed by a block 164 which queries the number of retries, just as the block 160 did. If less than N retries have been completed, a block 166 looks at the FRMR frame received from the remote end to determine the probable protocol and addressing to use, then reinitializes the port accordingly and sends a SABM(E) as appropriate in a new port configuration. The block 166 is followed by a repeat of the method steps beginning with the block 144.

An advantage of the present invention is eliminating the need to provide ports with all the possible combinations of port addressing and protocol modes and to publish a long list of dial-access numbers to support such ports which, an end user, unfamiliar with communications protocols, may find it difficult to match to his particular equipment. A further advantage is in avoiding possible congestion problems associated with a limited number of ports of a particular combination, and also avoiding incurring of overhead associated with having underused ports of other combinations.

Numerous modifications, variations, and adaptations may be made to the particular embodiments of the invention described above without departing from the scope of the invention, which is defined in the claims.

What is claimed is:

1. A method of operating a packet switching network to establish a link between an access port of the packet switching network and a remote end having a terminal or computer, the method comprising the steps of:
   (a) initializing the port with given values for link protocol and addressing mode;
   (b) inviting the remote end to initiate the link configuration;
   (c) if a command is received to initiate the link configuration, reinitiating the port with appropriate values for the link protocol and addressing mode in response to the link protocol and addressing of the remote end, and acknowledging receipt of the command;
   (d) if a frame reject is received, examining the frame reject to determine probable values of link protocol and addressing mode for the port;
   (e) if less than a predetermined number of tries have been made to establish the link, reinitializing the port to the probable values, and repeating the method beginning with the step (b), otherwise sending a command to initiate the link configuration; and
   (f) if any other frame is received or a predetermined time for the remote end to respond lapses, altering the addressing mode and, if less than the predetermined number of tries have been made, repeating the method beginning with the step (b), otherwise sending a command to initiate the link configuration.

2. A method as claimed in claim 1 wherein the step of reinitiating the port with appropriate values for the link protocol and addressing mode includes the steps of, if the command matches the link protocol of the port, checking the addressing, and reversing the addressing mode of the port if the addressing mode of the remote end is the same as the current addressing mode of the port.

3. A method as claimed in claim 1 wherein the step of reinitiating the port with appropriate values for the link protocol and addressing mode includes the steps of, if the command does not match the link protocol of the port, checking the addressing to determine if reversing the addressing mode is required, reinitializing the port as an alternate link protocol mode to the given value used for inviting the remote end and addressing mode as determined.

4. A method of operating a packet switching network to establish a link between an access port of the packet switching network and a remote end having a terminal or computer, the method comprising the steps of:

(a) initializing the port with first values for link protocol and addressing mode from a cyclical list of possible values for link protocol and addressing mode, and on each subsequent try, reinitializing the port with the next listed values and initiating the link configuration;

(b) if an acknowledgement is received, checking the addressing of the acknowledgement, and reversing the addressing mode of the port if the addressing mode of the remote end is the same as the current addressing mode of the port;

(c) if a command is received to initiate the link configuration, reinitiating the port with appropriate values for the link protocol and addressing mode in response to the link protocol and addressing of the remote end, and acknowledging receipt of the command;

(d) if a frame reject is received, examining the frame reject to determine probable values of link protocol and addressing mode for the port; and (e) if less than a predetermined number of tries have been made to establish the link, reinitializing the port to the probable values, and repeating the method beginning with the step (b), otherwise sending a command to initiate the link configuration.

5. A method as claimed in claim 4 wherein the step of reinitiating the port with appropriate values for the link protocol and addressing mode includes the steps of, if the command received the link protocol of the port, checking the addressing mode and reversing the addressing mode of the port if the addressing mode of the remote end is the same as the current addressing mode of the port.

6. A method as claimed in claim 4 wherein the step of reinitiating the port with appropriate values for the link protocol and addressing mode includes the steps of, if the command received does not match the link protocol of the port, reinitializing the port as an alternate link protocol mode to the given value used for initiating the link configuration and addressing mode as in the received command.

7. A method as claimed in claim 5 wherein the list of values includes: LAPB, DCE; LAPB, DTE: LAPBE, DCE; and LAPBE, DTE.

8. A method as claimed in claim 6 wherein the list of values includes: LAPB, DCE; LAPB, DTE; LAPBE, DCE; and LAPBE, DTE.

9. A method of operating a packet switching network to establish a link between an access port of the packet switching network and a remote end having a terminal or computer, the method comprising the steps of:

(a) initializing the port with given values for link protocol and addressing mode;

(b) inviting the remote end to initiate the link configuration;

(c) if a command is received to initiate the link configuration, reinitiating the port with appropriate values for the link protocol and addressing mode in response to the link protocol and addressing mode of the remote end, and acknowledging receipt of the command;

(d) if a frame reject is received, examining the frame reject to determine probable values of link protocol and addressing mode for the port, (e) if less than a first predetermined number of tries have been made to establish the link, reinitializing the port to the probable values, and repeating the method beginning with the step (b); and (f) if any other frame is received or a predetermined time for the remote end to respond lapses, altering the addressing mode and, if less than the predetermined number of tries have been made, repeating the method beginning with the step (b);

(g) if the first predetermined number of tries have been made, reinitializing the port with first values for link protocol and addressing modes from a cyclical list of possible values for link protocol and addressing mode, and on each subsequent retry, reinitializing the port with the next listed values and initiating the link configuration;

(h) if an acknowledgement is received, checking the addressing of the acknowledgement, and reversing the addressing mode of the port if the addressing mode of the remote end is the same as the current addressing mode of the port;

(i) if a command is received to initiate the link configuration, reinitiating the port with appropriate values for the link protocol and addressing mode in response to the link protocol and addressing mode of the remote end, and acknowledging receipt of the command;

(j) if a frame reject is received, examining the frame reject to determine probable values of link protocol and addressing for the port; and (k) if less than a second predetermined number of retries have been made to establish the link, reinitializing the port to the probable values, and repeating the method beginning with the step (b), otherwise sending a command to initiate the link configuration.

10. A method as claimed in claim 9 wherein the step of reinitiating the port with appropriate values for the link protocol and addressing mode includes the steps of, if the command matches the link protocol of the port, checking the addressing, and reversing the addressing mode of the port if the addressing mode of the remote end is the same as the current addressing mode of the port.

11. A method as claimed in claim 9 wherein the step of reinitiating the port with appropriate values for the link protocol and addressing mode includes the steps of, if the command does not match the link protocol of the port, checking the addressing to determine if reversing the addressing mode is required, reinitializing the port as an alternate link protocol mode to the given value used for inviting the remote end and addressing mode as determined.

12. A method as claimed in claim 9 wherein the step of reinitiating the port with appropriate values for the link protocol and addressing mode includes the steps of, if the command received matches the link protocol of the port, checking the addressing mode and reversing the addressing mode of the port, if the addressing mode of the remote end is the same as the current addressing mode of the port.

13. A method as claimed in claim 9 wherein the step of reinitiating the port with appropriate values for the link protocol and addressing mode includes the steps of, if the command received does not match the link protocol of the port, reinitializing the port as an alternate link protocol mode to the given value used for initiating the link configuration and addressing mode as in the received command.

14. A method as claimed in claim 9 wherein the list of values includes: LAPB, DCE: LAPB, DTE; LAPBE, DCE; and LAPBE, DTE.

* * * * *